United States Patent [19]

Smith et al.

[11] Patent Number: 5,592,361
[45] Date of Patent: Jan. 7, 1997

[54] ELECTRONIC DEVICE WITH IDENTIFICATION CARD RECEPTACLE

[75] Inventors: Mark A. Smith, Corvallis; John Sterner, Albany; Robert P. Bliven, Corvallis, all of Oreg.

[73] Assignee: Hewlett-Packard Company, Palo Alto, Calif.

[21] Appl. No.: 422,023

[22] Filed: Apr. 13, 1995

[51] Int. Cl.$^6$ ................ H05K 5/03; G09F 3/00
[52] U.S. Cl. ............ 361/679; 361/683; 40/776; 40/777
[58] Field of Search ................ 361/679, 683; 364/708.1; 40/642, 1.6, 5, 6, 490, 649, 775, 776; 283/74

[56] References Cited

U.S. PATENT DOCUMENTS 5,077,925  1/1992  Herrera et al. .................. 40/642
5,249,383  10/1993  McCusker et al. ............... 40/642

OTHER PUBLICATIONS

TOSIBA, T1600 Portable Personal Computer, User's Manual.

Primary Examiner—Leo P. Picard
Assistant Examiner—Jayprakash N. Gandhi
Attorney, Agent, or Firm—Curtis G. Rose

[57] ABSTRACT

An electronic device, such as a portable computer, has a receptacle for holding an identification card, such as a business card. The electronic device has an appliqué affixed to a first surface, such as the top or bottom surface of the electronic device. The appliqué has a transparent portion and a slot substantially adjacent to the transparent portion. A tray for holding an identification card is insertable through the slot into a receptacle located between the first surface and the applique, underneath the transparent portion of the appliqué.

17 Claims, 6 Drawing Sheets

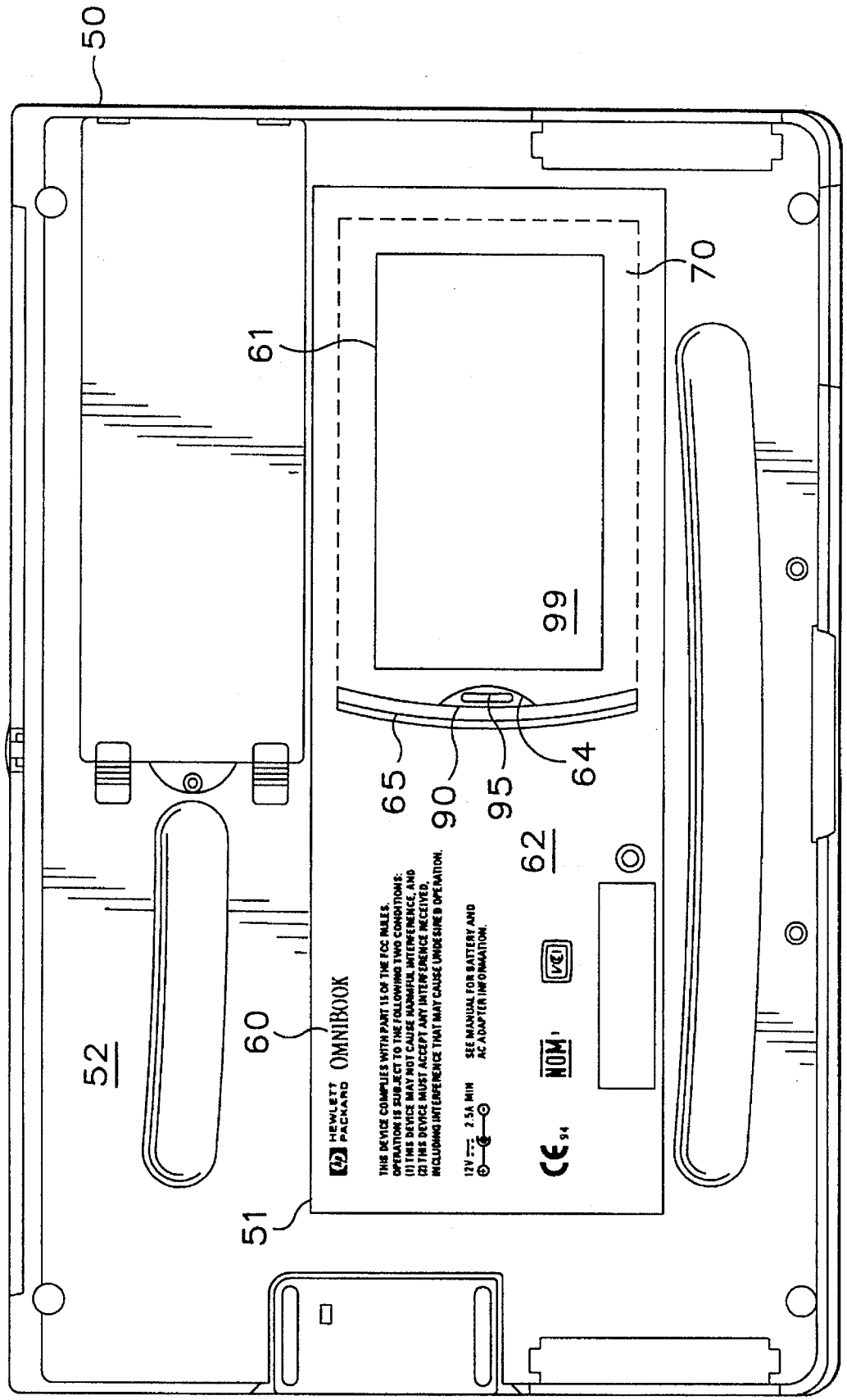

ELECTRONIC DEVICE WITH IDENTIFICATION CARD RECEPTACLE

FIELD OF THE INVENTION

This invention relates to the electronics field. More particularly, this invention is an electronic device with an identification card receptacle.

BACKGROUND OF THE INVENTION

Electronic devices, such as personal computers, have gotten dramatically smaller in recent years. While personal computers of yesteryear were exclusively heavy, bulky, and designed to permanently reside on a desktop, a large number of today's personal computers are small, lightweight, and designed to be carried by users with them nearly everywhere they go. While this reduction of size and weight has dramatically increased the flexibility and use of these portable computers, this increased mobility has not been without its problems. One such problem is that these portable computers are often so small and lightweight that users are often not completely conscious of whether they are carrying one with them or not. As a result, a large number of these very expensive portable computers are inadvertently left behind as their users rush on to yet another important appointment, such as catching a plane, attending a meeting, or the like.

Even if these expensive computers are fortunate enough to be found by a scrupulous person intent on returning them to their rightful owner, they often lack identification to enable this return to take place. One prior attempt to solve this problem is to allow a user to, through software programming, enter his or her name and address into the computer. Unfortunately, many users do not perform these steps, or, perform them so infrequently that up to date information is not provided. A bigger problem with this approach, however, is that a scrupulous person finding the misplaced computer often has no computer expertise and is therefore unable to perform the proper key sequences necessary to retrieve the name and address of the rightful owner.

SUMMARY OF THE INVENTION

An electronic device, such as a portable computer, has a receptacle for holding an identification card, such as a business card. The electronic device has an appliqué affixed to a first surface, such as the top or bottom surface of the electronic device. The appliqué has a transparent portion and a slot substantially adjacent to the transparent portion. A tray for holding an identification card is insertable through the slot into a receptacle located between the first surface and the appliqué, underneath the transparent portion of the appliqué.

DESCRIPTION OF THE DRAWINGS

FIG. 6 shows the bottom surface of the electronic device of FIG. 1 with an identification card residing in the tray and the tray residing in the receptacle.

DETAILED DESCRIPTION OF THE PREFERRED EMBODIMENT

Figure 1:
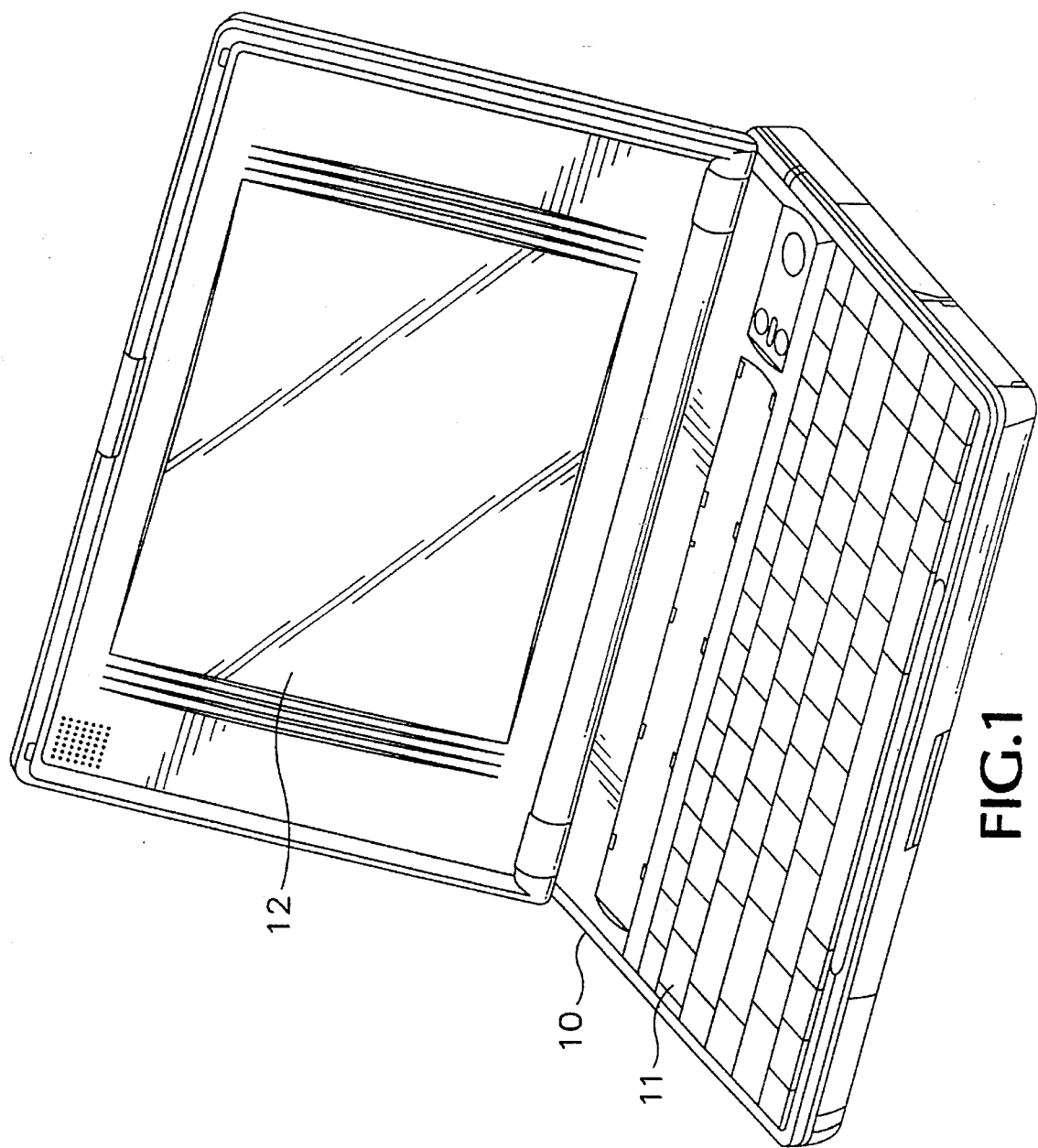
FIG. 1 shows the electronic device of the preferred embodiment of the invention.

FIG. 1 shows the electronic device of the preferred embodiment of the invention. Device 10 is a portable computer having keyboard 11 and display 12. In the preferred embodiment, device 10 is a Hewlett-Packard Omni-Book 600C portable computer, although other computers or electronic devices could be used.

Figure 2:
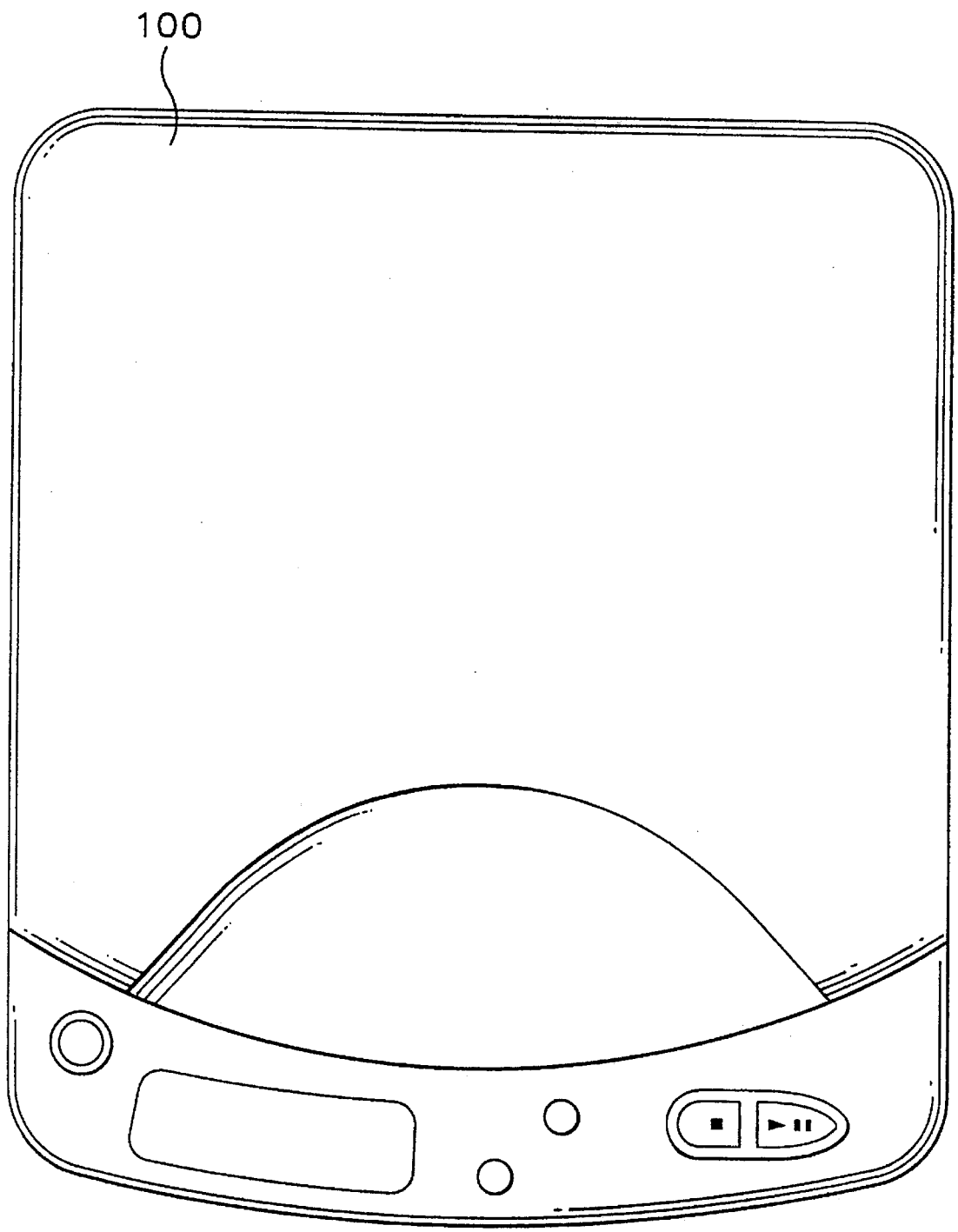
FIG. 2 shows an electronic device of an alternate embodiment of the invention.

FIG. 2 shows the electronic device of an alternate embodiment of the invention. Device 100 is a portable CD player. In this embodiment, device 100 is a Sony Discman portable CD player, modified as disclosed herein.

Figure 3:
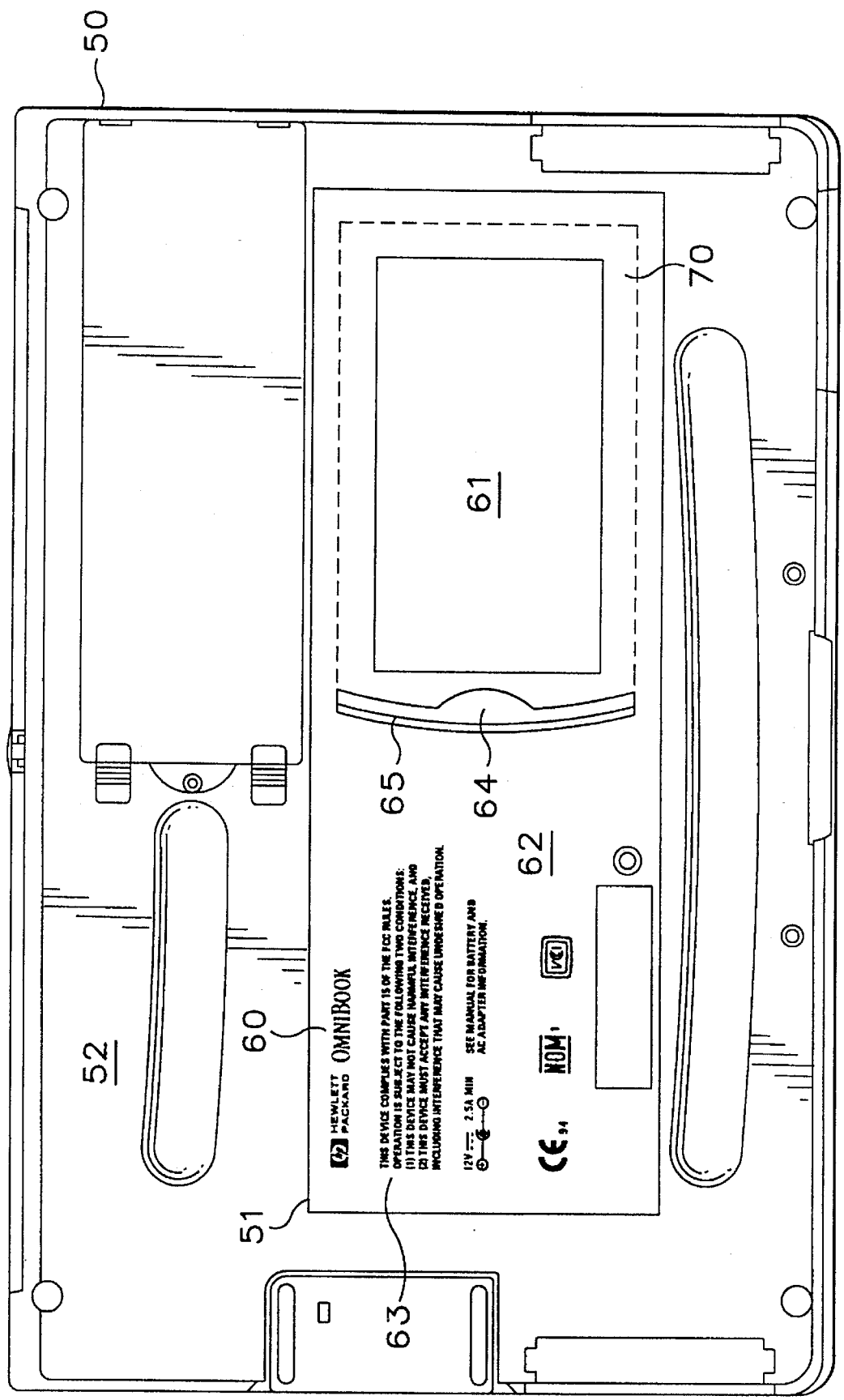
FIG. 3 shows the bottom surface of the electronic device of FIG. 1.

FIG. 3 shows the bottom surface of the electronic device of FIG. 1. Bottom surface 50 contains recessed portion 51 and non-recessed portion 52. Appliqué 60 is affixed to recessed portion 51 of bottom surface 50 so that appliqué 60 is substantially flush with non-recessed portion 52 of bottom surface 50. Appliqué 60 contains transparent portion 61 and non-transparent portion 62. In the preferred embodiment, transparent portion 61 is approximately the size of an identification card, although it could be larger or smaller and still fall within the spirit and scope of the invention. Non-transparent portion 62 preferably contains product indicia 63, such as the name of the product and regulatory information such as an FCC statement.

Receptacle 70 is provided between bottom surface 50 and appliqué 60. Receptacle 70 is located underneath transparent portion 61 of appliqué 60, and is of sufficient size to accommodate a tray containing an identification card in a manner that will be described in more detail later.

In the preferred embodiment, appliqué 60 is made from polycarbonate, although other materials could be used. Appliqué 60 is affixed to bottom surface 50 by applying an adhesive layer on those portions of appliqué 60 that are not used to form receptacle 70.

Appliqué 60 also contains slot 65 and detent 64. In the preferred embodiment, slot 65 is sloped inwardly towards bottom surface 50 and is arc shaped. The slope and shape of slot 65 makes it easier to insert and remove a tray containing an identification card into and out of receptacle 70, in a manner that will be described in more detail later.

Figure 4:
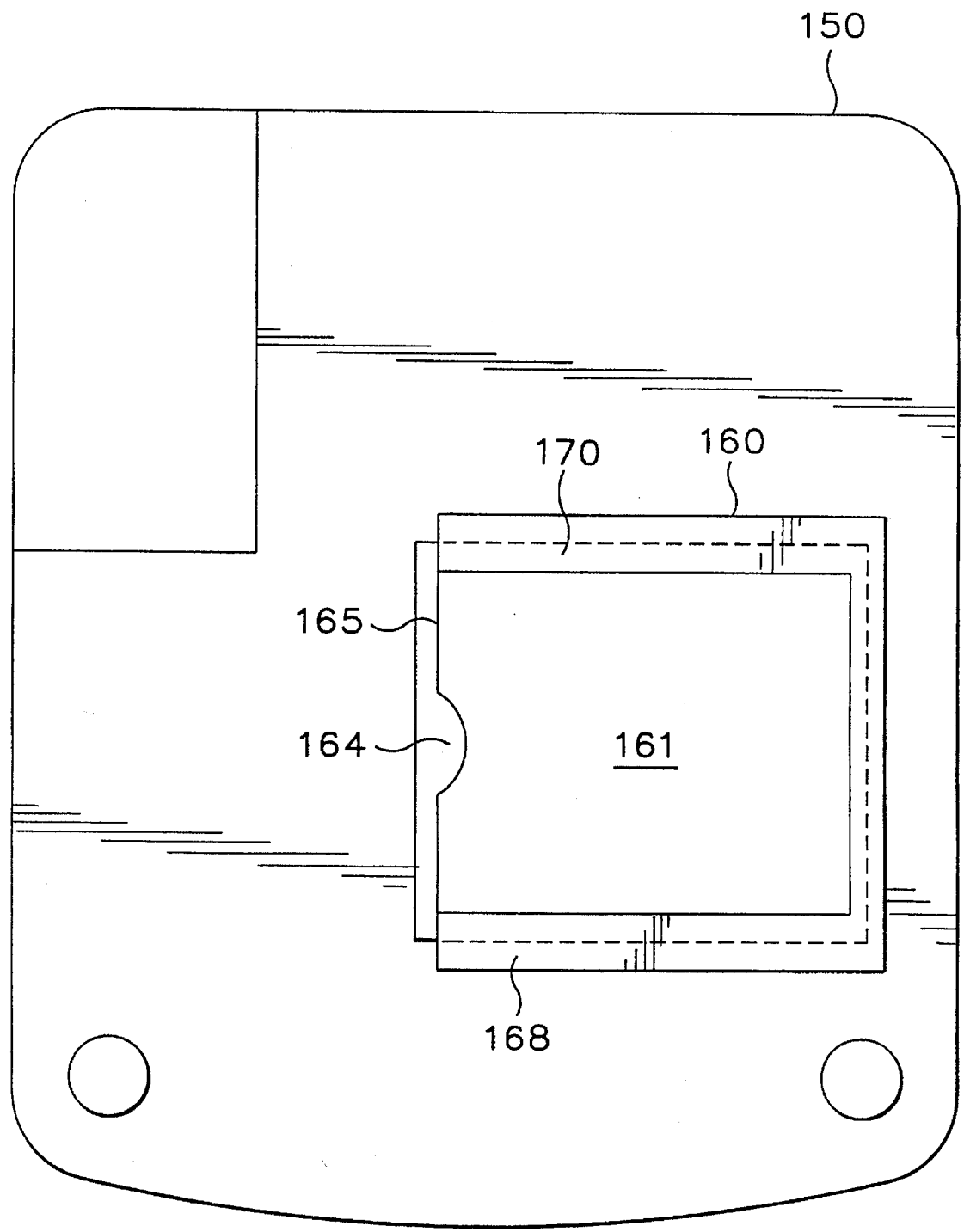
FIG. 4 shows the bottom surface of the electronic device of FIG. 2.

FIG. 4 shows the bottom surface of the electronic device of FIG. 2. Unlike the electronic device of FIG. 1, bottom surface 150 does not contain a recessed portion and non-recessed portion. Appliqué 160 is affixed directly to and protrudes slightly from bottom surface 150. Unlike appliqué 60 of FIG. 2, appliqué 160 contains only transparent portion 161. In this embodiment, appliqué 160 is affixed to bottom surface 150 by applying an adhesive layer on those portions of appliqué 160 that are not used to form receptacle 170 (i.e. outer portion 168).

Receptacle 170 is provided between bottom surface 150 and appliqué 160. Receptacle 170 is located inside outer portion 168 of appliqué 160, and is of sufficient size to accommodate a tray containing an identification card in a manner that will be described in more detail later. Appliqué 160 contains slot 165 and detent 164. In this embodiment, unlike slot 65 in the preferred embodiment, slot 165 is neither sloped inwardly nor arc shaped.

Figure 5:
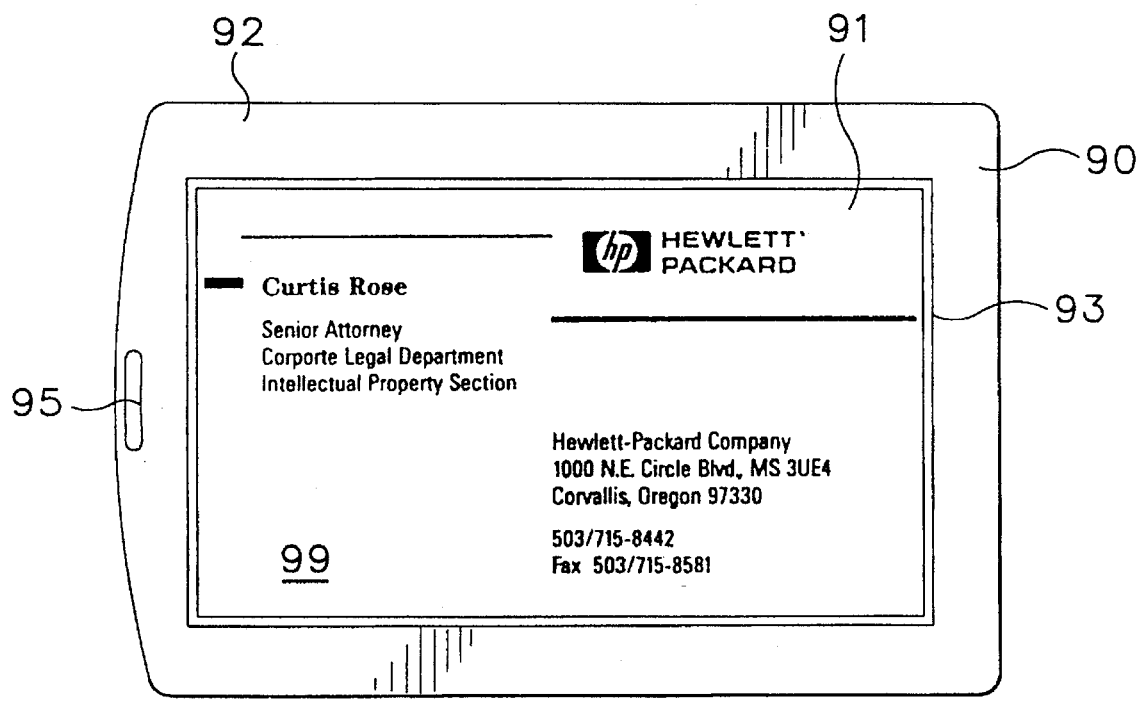
FIG. 5 shows the tray of the preferred embodiment of the invention.

FIG. 5 shows the tray of the preferred embodiment of the invention. Tray 90 contains recessed portion 91 and non-recessed portion 92. In the preferred embodiment, recessed portion 91 is approximately the same length and width of a standard US business card, such as business card 99. When business card 99 is placed in recessed portion 91, business card 99 is substantially flush with non-recessed portion 92.

Tray 90 also contains removable spacer portion 93. When removable spacer portion 93 is removed, recessed portion 91 becomes approximately the same length and width of a standard European or Japanese business card.

Tray 90 also contains nail catch 95. When tray 90 is fully inserted through slot 65 or 165 into receptacle 70 or 170 of electronic device 10 or 100, respectively, nail catch 95 is accessible from detent 64 or 164, and allows tray 90 to be easily removed from receptacles 70 or 170, respectively.

FIG. 6 shows the bottom surface of the electronic device of FIG. 1 with identification card 99 residing in tray 90 and tray 90 residing in receptacle 70. Tray 90 is removed from receptacle 70 by inserting a fingernail into nail catch 95 (accessible from detent 64) and pulling tray 90 out of slot 65 of appliqué 60. Business card 99 is then inserted into recessed portion 91 of tray 90, and tray 90 is placed back in receptacle 70 by pushing tray 90 through slot 65 of appliqué 60.

What is claimed is:

1. An electronic device having a first surface, said electronic device comprising:

an appliqué affixed to said first surface, said appliqué further comprising:

a transparent portion;

a slot proximally located to said transparent portion; and a tray for holding an identification card, said tray insertable through said slot into a receptacle located between said first surface and said appliqué, underneath said transparent portion of said appliqué.

2. The electronic device of claim 1, wherein said first surface further comprises a recessed portion and a non-recessed portion, said appliqué being affixed to said recessed portion of said first surface, wherein said appliqué is substantially flush with said non-recessed portion of said first surface of said electronic device.

3. The electronic device of claim 1, wherein said slot is inwardly sloped.

4. The electronic device of claim 1, wherein said slot is arc shaped.

5. The electronic device of claim 1, wherein said tray further comprises:

a removable spacer portion that, when removed, allows said tray to accommodate a larger identification card than when said removable spacer portion is not removed.

6. The electronic device of claim 1, wherein said tray further comprises:

a nail catch to allow said tray to be easily removed from said receptacle.

7. The electronic device of claim 1, wherein said appliqué further comprises:

a non-transparent portion.

8. The electronic device of claim 7, wherein said non-transparent portion of said appliqué further comprises product indicia.

9. The electronic device of claim 1, wherein said electronic device is a portable computer.

10. The electronic device of claim 1, wherein said electronic device is a portable CD player.

11. The electronic device of claim 2, wherein said slot is inwardly sloped.

12. The electronic device of claim 11, wherein said slot is arc shaped.

13. The electronic device of claim 12, wherein said appliqué further comprises:

a non-transparent portion.

14. The electronic device of claim 13, wherein said tray further comprises:

a nail catch to allow said tray to be easily removed from said receptacle.

15. The electronic device of claim 14, wherein said tray further comprises:

a removable spacer portion that, when removed, allows said tray to accommodate a larger identification card than when said removable spacer portion is not removed.

16. A method of placing a tray containing an identification card in a receptacle located between a first surface of an electronic device and an appliqué affixed to said first surface of said electronic device, said appliqué having a transparent portion over said receptacle and having a slot proximally located to said transparent portion, said tray comprising a recessed portion and a nail catch, said method comprising the steps of:

inserting a fingernail in said nail catch of said tray;

pulling said tray out of said slot with said fingernail engaged in said nail catch of said tray;

inserting an identification card into said recessed portion of said tray; and pushing said tray back through said slot into said receptacle.

17. An electronic device having a first surface comprising a recessed portion and a non-recessed portion, said electronic device comprising:

an appliqué affixed to said recessed portion of first surface, wherein said appliqué is substantially flush with said non-recessed portion of said first surface of said electronic device, said appliqué further comprising:

a transparent portion;

an inwardly sloped, arc shaped slot substantially adjacent to said transparent portion;

a non-transparent portion further comprising device indicia;

a tray for holding an identification card, said tray insertable through said slot into a receptacle located between said first surface and said appliqué, underneath said transparent portion of said appliqué, said tray further comprising:

a removable spacer portion that, when removed, allows said tray to accommodate a larger identification card than when said removable spacer portion is not removed; and a nail catch to allow said tray to be easily removed from said receptacle.

* * * * *